United States Patent
Ryu et al.

(10) Patent No.: US 8,846,248 B2
(45) Date of Patent: Sep. 30, 2014

(54) METAL-SULFUR ELECTRODE FOR LITHIUM-SULFUR BATTERY AND PREPARING METHOD THEREOF

(75) Inventors: Hee Yeon Ryu, Gyeonggi-do (KR); Hee Jin Woo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/587,187

(22) Filed: Aug. 16, 2012

(65) Prior Publication Data

US 2013/0130116 A1     May 23, 2013

Related U.S. Application Data

(62) Division of application No. 13/370,647, filed on Feb. 10, 2012.

(30) Foreign Application Priority Data

Nov. 22, 2011    (KR) ........................ 10-2011-0122478

(51) Int. Cl.
| | |
|---|---|
| H01M 4/13 | (2010.01) |
| H01M 4/04 | (2006.01) |
| H01M 4/1397 | (2010.01) |
| H01M 4/58 | (2010.01) |
| H01M 4/62 | (2006.01) |
| H01M 4/66 | (2006.01) |
| H01M 4/136 | (2010.01) |

(52) U.S. Cl.
CPC .............. *H01M 4/1397* (2013.01); *H01M 4/62* (2013.01); *H01M 4/661* (2013.01); *H01M 4/0404* (2013.01); *H01M 4/625* (2013.01); *H01M 4/136* (2013.01); *H01M 4/581* (2013.01); *H01M 4/5815* (2013.01); *Y02E 60/122* (2013.01); *Y10S 977/948* (2013.01)

USPC ........ 429/217; 429/212; 429/231.8; 427/532; 977/948

(58) Field of Classification Search
CPC ....... H01M 4/02; H01M 4/04; H01M 4/0404; H01M 4/136; H01M 4/1397; H01M 4/0402; H01M 4/625; H01M 4/581; H01M 4/661; H01M 4/5815; H01M 4/62; Y02E 60/122
USPC ......................................................... 429/217
See application file for complete search history.

(56) References Cited

U.S. PATENT DOCUMENTS

| | | | |
|---|---|---|---|
| 2007/0031317 A1* | 2/2007 | Akamatsu et al. | 423/447.1 |
| 2010/0261058 A1* | 10/2010 | Lopatin et al. | 429/212 |

(Continued)

FOREIGN PATENT DOCUMENTS

| | | |
|---|---|---|
| JP | 2005251586 A | 9/2005 |
| JP | 2006143496 A | 6/2006 |
| JP | 2011023276 A | 2/2011 |

(Continued)

OTHER PUBLICATIONS

Chen, X.Q., et al., "Aligning single-wall carbon nanotubes with an alternating-current electric field", Applied Physics Letters, vol. 78, No. 2, pp. 3714-3716 (Jun. 4, 2001).

*Primary Examiner* — Gary Harris
(74) *Attorney, Agent, or Firm* — Edwards Wildman Palmer LLP; Peter F. Corless

(57) ABSTRACT

Disclosed is a metal-sulfur electrode for a lithium-sulfur battery and a method for preparing the same. More particularly, a metal-sulfur electrode for a lithium-sulfur battery is prepared by coating a slurry mixture including sulfur, a conductive material and a binder as an electrode active material on a metal electrode and drying the same while applying an electric field such that the conductive material is aligned adequately so as to provide maximize efficiency during repeated charging and discharging when used in the anode of the lithium-sulfur battery.

7 Claims, 1 Drawing Sheet

(56) References Cited

U.S. PATENT DOCUMENTS

| | | |
|---|---|---|
| 2011/0091773 A1* | 4/2011 | Wei .......................... 429/231.8 |
| 2011/0165466 A1* | 7/2011 | Zhamu et al. ............. 429/231.8 |
| 2011/0262807 A1 | 10/2011 | Boren et al. |
| 2011/0293993 A1 | 12/2011 | Ryu |
| 2012/0264017 A1* | 10/2012 | Nazri et al. ................ 429/218.1 |

FOREIGN PATENT DOCUMENTS

| | | |
|---|---|---|
| KR | 10-2004-0009381 A | 1/2004 |
| KR | 10-0818383 | 2/2007 |

\* cited by examiner

METAL-SULFUR ELECTRODE FOR LITHIUM-SULFUR BATTERY AND PREPARING METHOD THEREOF

CROSS-REFERENCE TO RELATED APPLICATIONS

This application is a divisional application of U.S. application Ser. No. 13/370,647, filed Feb. 10, 2012, which claims priority under 35 U.S.C. §119(a) to Korean Patent Application No. 10-2011-0122478, filed on Nov. 22, 2011, in the Korean Intellectual Property Office, the disclosure of which are incorporated herein by reference in their entirety.

BACKGROUND (a) Technical Field

The present invention relates to a metal-sulfur electrode for a lithium-sulfur battery and a method for preparing the same. More particularly, it relates to a metal-sulfur electrode for a lithium-sulfur battery prepared by coating a slurry mixture including sulfur, a conductive material and a binder as an electrode active material on a metal electrode and drying the same while applying an electric field so that the conductive material is aligned adequately so as to provide maximized efficiency during repetitive charging and discharging when used in the anode of the lithium-sulfur battery.

(b) Background Art

Metal-sulfur electrodes are typically used as anodes in a lithium-sulfur battery. Lithium-sulfur batteries are also known as high-performance lithium batteries in the vehicle industry. In the metal sulfur electrode, a conductive material is typically used since sulfur is an insulator and lacks electrical conductivity. The conductive material included in the metal-sulfur electrode provides a conduction path for lithium ions to travel to sulfur as well as an electron conduction path between a metal (e.g., aluminum) electrode and the sulfur. To apply the lithium-sulfur battery to electric vehicles with mileage comparable to that of gasoline-fueled vehicles, the energy density should be between 300-500 Wh/kg. To achieve this, the active material is formed in a relatively thick manner on the aluminum electrode to increase the amount of sulfur per unit area. As the amount of sulfur increases the amount of conductive material must increase as well. However, increasing the amount of conductive material may lead to reduced conductivity of the electrode as charging and discharging are repeated over time. To overcome this problem, an electrode having pores allowing for easy transportation of polysulfide is necessary.

The lithium-sulfur batteries have a theoretical energy density of 2,600 Wh/kg, which is much higher than 570 Wh/kg of the existing lithium-ion batteries. However, in order to increase the energy density of a battery pack for use in a vehicle, the proportion of sulfur should be maximized in an active material consisting of sulfur, a conductive material and a binder. Furthermore, the current lithium sulfur batteries also suffer from decreased capacity and lifetime after repeated charging and discharging.

The existing metal-sulfur electrode for a lithium-sulfur battery requires a large amount of conductive material to provide improved conductivity since the conductive material is not aligned in a coating layer of sulfur, the conductive material [e.g., carbon nanotube (CNT)] and a binder on a metal electrode, e.g., an aluminum electrode, as shown in FIG. 1. This causes decreased energy density. Furthermore, the electrode is ineffective since the sulfur is not uniformly dispersed in the conductive material during recharging following discharging. In addition, it has a short lifetime because of poor durability.

In this regard, Japanese Patent Application Publication No. 2005-251586 discloses a lithium secondary battery which includes a positive electrode current collector in which sulfur, a conductive material and a binder are included. However, the above-described problem associated with the use of the conductive material is not solved in this method.

Furthermore, Japanese Patent Application Publication No. 2006-143496 discloses formation of carbon nanotubes on a substrate and orientation of the carbon nanotubes in a desired direction by applying an electric field. However, it merely relates to a technique of aligning carbon nanotubes in a desired direction using an electric field without regard to sulfur. Hence, it does not solve the above-described problems associated with the metal-sulfur electrode.

Even further, Japanese Patent Application Publication No. 2011-23276 discloses a current collector which includes a resin layer having conductivity, the resin layer includes an electric field-responsive polymer material expanding or contracting reversibly in response to application of an electric field. However, the conductive material is not related to the metal-sulfur electrode at all and sulfur is not used in this patent.

Korean Patent Application Publication No. 2007-17062 discloses a method of forming a direct-current electric field between electrodes to induce formation of conductive materials and active materials. However, this patent is also not related to the metal-sulfur electrode.

That is to say, the existing techniques fail to solve the problem of providing effectively maintained conductivity in an active material which includes sulfur, a conductive material and a binder in a metal-sulfur electrode for a lithium-sulfur battery in order to increase energy density.

SUMMARY

In the illustrative embodiment of the present invention the alignment of a conductive material used in a metal-sulfur electrode of the next-generation lithium-sulfur battery for electric vehicles is adjusted by using an electric field. By conducting the above technique, the energy density of the conductive material can be greatly improved and the electrode using the same exhibits improved durability during charge-discharge cycles.

More specifically, the present invention is directed to providing a metal-sulfur electrode for a lithium-sulfur battery with improved energy density and charge-discharge cycle durability. The present invention is also directed to providing a method for preparing a metal-sulfur electrode for a lithium-sulfur battery wherein a conductive material included in the metal-sulfur electrode is aligned to have directionality by applying an electric field.

In one aspect, the present invention provides a metal-sulfur electrode for a lithium-sulfur battery, including an electrode active material including sulfur, a conductive material made up of a needle- or rod-shaped carbon material, and a binder coated on a metal electrode. The conductive material is aligned to have directionality in one direction.

In another aspect, the present invention provides a method for preparing a metal-sulfur electrode for a lithium-sulfur battery which includes coating a slurry mixture of an electrode active material containing sulfur, a conductive material made up of a needle- or rod-shaped carbon material, and a binder in a solvent on a metal electrode and drying the same while applying an electric field to the metal electrode in one direction such that the conductive material is aligned to have directionality in one direction.

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1:
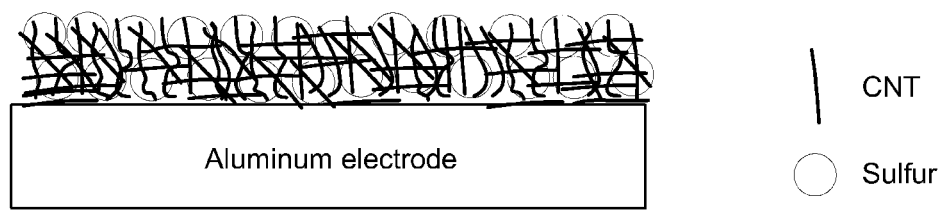
FIG. 1 schematically shows the structure of an existing metal-sulfur electrode of a lithium-sulfur battery.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The present invention provides a metal-sulfur electrode for a lithium-sulfur battery wherein a conductive material in an electrode active material coated on a metal electrode is aligned vertically with directionality. The metal electrode may include a metal electrochemically stable in the high-voltage range. Preferably, an aluminum electrode may be used.

The electrode active material is coated on the metal electrode, and mainly comprises a mixture of sulfur, a conductive material and a binder. The sulfur may be in the form of spherical powder (e.g., 20 μm or smaller), and the conductive material may be a needle- or rod-shaped carbon material. Specifically, carbon nanotube (CNT) or vapor grown carbon fiber (VGCF) may be used as the conductive material. And, the binder may be polyvinylidene fluoride (PVdF), polyvinylidene fluoride (PVdF)-co-hexafluoropropylene (HFP), or the like. Preferably, however, PVdF-co-HFP may be used. The electrode active material may include sulfur, the conductive material and the binder at a weight ratio of about 30-90% sulfur, 5-60% conductive material and 2-30% binder. Most specifically, the weight ratio of sulfur, the conductive material and the binder may preferably be 8:1:1. In this case, the amount of the conductive material (i.e., 10%) is much less than the amount of conductive material (i.e., 20%) which is found in existing metal-sulfur electrodes. Furthermore, the content of sulfur (i.e., 80%) is more than the amount of sulfur (i.e., 60%) of the existing metal-sulfur electrode as well.

In the present invention, the conductive material included in the electrode active material is aligned to have directionality in one direction. In general, the conductive material is aligned perpendicularly to the metal electrode. As used herein, the expression "perpendicularly" includes directionality with an angle of 90-20°.

The present invention also provides a method for preparing a metal-sulfur electrode for a lithium-sulfur battery which includes coating a slurry mixture of an electrode active material which includes sulfur, a conductive material which includes a needle- or rod-shaped carbon material, and a binder in a solvent on a metal electrode and drying the same while applying an electric field to the metal electrode in one direction such that the conductive material is aligned to have directionality in one direction.

The solvent is used in an amount of about 300 parts by weight based on 100 parts by weight of the electrode active material. The solvent may be N,N-methylpyrrolidone (NMP), dimethylformamide (DMF) or dimethylacetamide (DMAc). While the slurry mixture including the electrode active material is dried, the solvent serves as a fluid allowing the conductive material to be aligned to have directionality by the applied electric field.

Figure 2:
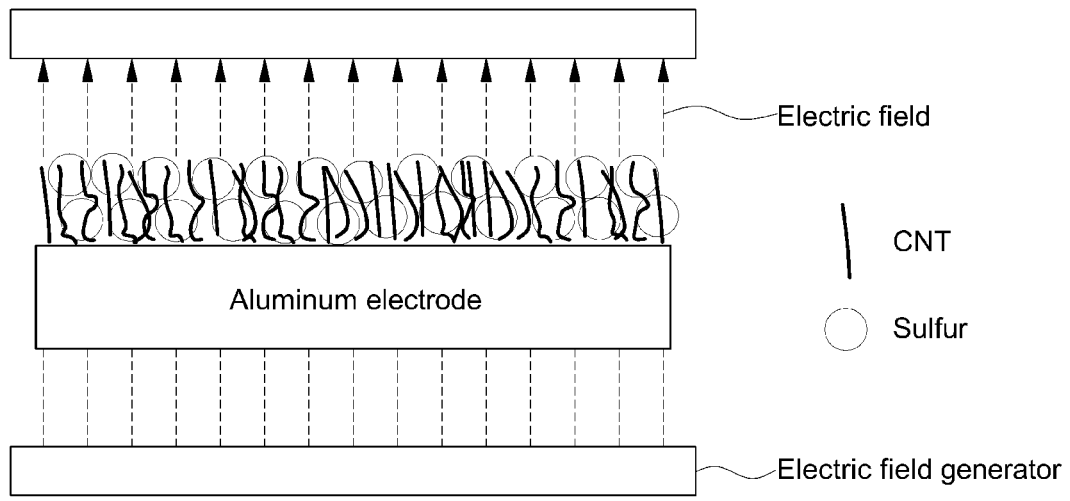
FIG. 2 schematically shows the structure of a metal-sulfur electrode prepared according to an exemplary embodiment of the present invention by applying an electric field using an electric field generator.

In the present invention, an electric field is applied to the metal electrode on which the slurry mixture is coated, so that the conductive material in the active material included in the slurry mixture is aligned perpendicularly to the metal electrode to have directionality. As schematically shown in FIG. 2, the electric field may be applied perpendicularly to the metal electrode using an electric field generator. The electric field may be about 15-50 kV/m with an alternating-current (AC) frequency of about 10 Hz to 10 kHz. If the electric field is too weak, a desired directionality is not achieved. Meanwhile, if the electric field is too strong, the directionality of the conductive material near the electrode may be distorted due to strong thermal energy. The electric field generator applies the electric field so as to align the conductive material to have a specific directionality.

In the present invention, the needle- or rod-shaped carbon conductive material in the metal electrode active material is aligned to have directionality. That is to say, by aligning the conductive material to have directionality in the desired direction by applying an electric field while the slurry mixture of the sulfur, the conductive material and the binder in the solvent coated on the metal electrode is dried, the sulfur can be disposed at optimum positions capable of maximizing efficiency during repeated charging and discharging. Also, by optimizing the amount of the conductive material by aligning it to have directionality, the relative amount of sulfur can be increased while improving lifetime and energy density.

As such, in the present invention, the needle- or rod-shaped conductive material is aligned in the desired direction by applying an electric field while the slurry mixture of the sulfur, the conductive material and the binder in the solvent coated on the metal electrode is dried. As a result, the amount of the conductive material can be reduced and the sulfur can be disposed at all parts of the conductive material during recharging as compared to the existing metal-sulfur electrode.

Also, the problems of the existing metal electrode that a large amount of conductive material has to be used since the conductive material is mixed with sulfur without directionality and that the optimum structure of the active material cannot be maintained since the sulfur returning during recharging is blocked by the conductive material can be solved by the present invention.

Accordingly, the metal-sulfur electrode according to the present invention has an improved active material structure since the electric field is applied during the coating of the active material so that the conductive material has directionality while maintaining conductivity, thus reducing the required amount of the conductive material and allowing the sulfur returning during recharging to be disposed in the well-aligned conductive material.

The metal-sulfur electrode according to the present invention can be used as an anode of a lithium-sulfur battery. When it is used as the anode of the lithium-sulfur battery, it increases conductivity and reactivity of the electrode active material while maintaining directionality of the conductive material in the active material. As a result, the battery lifespan is improved since the sulfur is oxidized during battery recharging at a reproducible position around the conductive material having directionality.

Furthermore, since the amount of the conductive material used in the electrode active material can be minimized and the relative proportion of the sulfur in the active material can be increased, the loading amount and the energy density of the active material can be enhanced.

EXAMPLES

The example and test example will now be described. The following examples are for illustrative purposes only and not intended to limit the scope of this invention.

Example

To prepare an anode with controlled directionality of a conductive material, 80% of sulfur (100 mesh, Aldrich), 10% of carbon nanotube (Hanwha Chemical) and 10% of a binder (PVdF, Kynar) were mixed in a solvent (NMP, Aldrich) and milled at 600 rpm for 12 hours using a planetary mill to prepare a slurry, which was coated on an aluminum electrode to about 50 μm thickness using a doctor blade and dried for 12 hours while applying an electric field using an electric field generator. The drying was performed slowly at room temperature under a strong electric field. Subsequently, the slurry was further dried in an oven at 50-80° C. to evaporate the remaining solvent. A unit cell was prepared by disposing a porous separator (Celgard 2325, Celgard) between the resulting anode with controlled directionality of the conductive material and a lithium cathode and coating an electrolyte [1M LiCF$_3$SO$_3$/0.5M LiTFSI+DME (1,2-dimethoxyethane, anhydrous, 99.5%), Aldrich] over the entire structure.

The above example is only one of many possible embodiments. The resulting metal electrode has a structure schematically shown in FIG. 2. The metal electrode with controlled directionality of the conductive material can be used for a lithium-sulfur battery, and the conductive material having directionality may also be VGCF, CNT, or the like.

Test Example

Battery performance of a lithium-sulfur battery using the metal electrode prepared in Example was compared with that of a lithium-sulfur battery using the existing metal electrode.

Tests were carried out for two conditions of the sulfur/conductive material/binder ratio of the anode at 6/2/2 and 8/1/1, with or without applying an electric field. The result is shown in Table 1.

TABLE 1

| Sample | Anode | Cathode | Electric field | Initial capacity (cycle 1) | Capacity (cycle 30) | Capacity ratio (initial/cycle 30) |
|---|---|---|---|---|---|---|
| S1 | S/C/binder (6/2/2) | Li | None | 1212 | 813 | 0.6707 |
| S2 | S/C/binder (6/2/2) | Li | 30 kV/m, 100 Hz, 10 hr | 1430 | 1106 | 0.7734 |
| S3 | S/C/binder (8/1/1) | Li | None | 1261 | 790 | 0.627 |
| S4 | S/C/binder (8/1/1) | Li | 30 kV/m, 100 Hz, 10 hr | 1443 | 1152 | 0.7983 |

When the metal-sulfur electrode according to the present invention is used as the anode of the lithium-sulfur battery, it increases conductivity and reactivity of the electrode active material while maintaining directionality of the conductive material in the active material. As a result, the battery life is improved since the sulfur is oxidized during battery recharging at a reproducible position around the conductive material having directionality.

Furthermore, since the amount of the conductive material used in the electrode active material can be minimized and the relative proportion of the sulfur in the active material can be increased, the load amount and the energy density of the active material can be enhanced.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a metal-sulfur electrode for a lithium-sulfur battery, comprising coating a slurry mixture of an electrode active material in a solvent on a metal electrode, wherein the slurry mixture includes sulfur, a conductive material comprising a needle- or rod-shaped carbon material, and a binder; and thereafter drying the slurry mixture while applying an electric field generated using an electric field generator to the metal electrode in one single direction so that the needle- or rod-shaped carbon material is aligned to have directionality in one direction in the slurry mixture including the sulfur, conductive material comprising the needle- or rod-shaped carbon material, and the binder;

wherein the electric field is 15-50 kV/m with an alternating-current (AC) frequency of 10 Hz to 10 kHz and applied perpendicularly to the metal electrode with an angle of 90-20°;

wherein the electrode active material comprises sulfur, the conductive material and the binder at a weight ratio of 30-90%:5-60%:2-30%; and wherein the carbon material is selected from vapor grown carbon fiber (VGCF) or carbon nanofiber (CNF).

2. The method of claim 1, wherein the electric field is applied perpendicularly to the metal electrode with an angle of 90-20°.

3. The method of claim 1, wherein the solvent is selected from a group consisting of N,N-methylpyrrolidone (NMP), dimethylformamide (DMF) and dimethylacetamide (DMAc).

4. The method of claim 1, wherein the solvent is used in an amount of 150-300 parts by weight based on 100 parts by weight of the electrode active material.

5. A metal-sulfur electrode prepared by the method of claim 1.

6. The method of claim 1, wherein the metal electrode comprises aluminum.

7. The method of claim 1, wherein the binder is selected from a group consisting of polyvinylidene fluoride (PVdF) or polyvinylidene fluoride (PVdF)-co-hexafluoropropylene (HFP).

* * * * *